(12) United States Patent
Takeyama et al.

(10) Patent No.: US 12,215,825 B2
(45) Date of Patent: Feb. 4, 2025

(54) HIGH-PRESSURE HYDROGEN APPARATUS GAS SEAL MEMBER AND HIGH-PRESSURE HYDROGEN APPARATUS

(71) Applicants: ZEON CORPORATION, Tokyo (JP); KYUSHU UNIVERSITY, NATIONAL UNIVERSITY CORPORATION, Fukuoka (JP)

(72) Inventors: Yoshihisa Takeyama, Tokyo (JP); Shin Nishimura, Fukuoka (JP)

(73) Assignees: ZEON CORPORATION, Tokyo (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 143 days.

(21) Appl. No.: 17/905,763

(22) PCT Filed: Mar. 23, 2021

(86) PCT No.: PCT/JP2021/012075
§ 371 (c)(1),
(2) Date: Sep. 7, 2022

(87) PCT Pub. No.: WO2021/193667
PCT Pub. Date: Sep. 30, 2021

(65) Prior Publication Data
US 2023/0110350 A1 Apr. 13, 2023

(30) Foreign Application Priority Data
Mar. 26, 2020 (JP) .................. 2020-056332

(51) Int. Cl.
*F17C 13/06* (2006.01)
*C09K 3/10* (2006.01)
*F17C 1/00* (2006.01)

(52) U.S. Cl.
CPC ............ *F17C 13/06* (2013.01); *C09K 3/1006* (2013.01); *F17C 1/005* (2013.01);
(Continued)

(58) Field of Classification Search
CPC .................................................. C09K 3/1006
See application file for complete search history.

(56) References Cited

U.S. PATENT DOCUMENTS 9,748,016 B2  8/2017  Shigeta et al.
11,448,319 B2  9/2022  Nishimura et al.
(Continued)

FOREIGN PATENT DOCUMENTS

CN  110431207 A  11/2019
WO  2013047796 A1  4/2013
(Continued)

OTHER PUBLICATIONS

Chen Yu-Li et al., Fractal Mechanics of Hydrogen Storage in the Bundle of Carbon Nanotubes, Engineering Mechanics, Oct. 2009, vol. 26, No. 10, pp. 14-22.
(Continued)

*Primary Examiner* — William D Young
(74) *Attorney, Agent, or Firm* — KENJA IP LAW PC (57) ABSTRACT

The present disclosure provides a high-pressure hydrogen apparatus gas seal member which is excellent in durability and is capable of sufficiently suppressing an occurrence of a blister fracture. A high-pressure hydrogen apparatus gas seal member of the present disclosure is a high-pressure hydrogen apparatus gas seal member made of a crosslinked product of an elastomer composition which comprises an elastomer and fibrous carbon nanostructures having an average length of 100 μm or more and 1000 μm or less, wherein the fibrous carbon nanostructures have a surface fractal dimension of 2.3 or more and 3.0 or less or a radius of
(Continued)

gyration of 50 nm or more and 500 nm or less, and further the fibrous carbon nanostructures has an inner diameter of 4.0 nm or less.

14 Claims, 1 Drawing Sheet

(52) U.S. Cl.
CPC ............... *C09K 2003/1053* (2013.01); *C09K 2200/0282* (2013.01); *C09K 2200/0607* (2013.01); *F17C 2221/012* (2013.01); *F17C 2223/036* (2013.01); *F17C 2260/036* (2013.01); *F17C 2270/0139* (2013.01); *F17C 2270/0168* (2013.01)

(56) References Cited

U.S. PATENT DOCUMENTS

| | | | |
|---|---|---|---|
| 2005/0070657 A1* | 3/2005 | Elkovitch | C08K 7/24 524/495 |
| 2011/0073344 A1 | 3/2011 | Zhang et al. | |
| 2011/0172087 A1 | 7/2011 | Tsao et al. | |
| 2014/0217331 A1* | 8/2014 | Hata | B82Y 30/00 252/511 |
| 2016/0355670 A1* | 12/2016 | Lee | C08L 77/02 |
| 2018/0362734 A1 | 12/2018 | Takeyama | |
| 2020/0041000 A1 | 2/2020 | Nishimura et al. | |
| 2020/0224070 A1 | 7/2020 | Nishimura et al. | |

FOREIGN PATENT DOCUMENTS

| | | |
|---|---|---|
| WO | 2013080912 A1 | 6/2013 |
| WO | 2016208203 A1 | 12/2016 |
| WO | 2018151099 A1 | 8/2018 |
| WO | 2018180251 A1 | 10/2018 |

OTHER PUBLICATIONS

Sep. 22, 2022, International Preliminary Report on Patentability issued in the International Patent Application No. PCT/JP2021/012075.

Jun. 15, 2021, International Search Report issued in the International Patent Application No. PCT/JP2021/012075.

Cheng-Hua Sun et al., Surface fractal dimension of single-walled carbon nanotubes, Physical Review B, Jan. 16, 2004, vol. 69, Issue 3.

Mar. 13, 2024, the Extended European Search Report issued by the European Patent Office in the corresponding European Patent Application No. 21775770.7.

* cited by examiner

HIGH-PRESSURE HYDROGEN APPARATUS GAS SEAL MEMBER AND HIGH-PRESSURE HYDROGEN APPARATUS

TECHNICAL FIELD

The present disclosure relates to a high-pressure hydrogen apparatus gas seal member and a high-pressure hydrogen apparatus.

BACKGROUND

Gas seal members such as packing and gaskets are conventionally used as members for preventing air leakage. Such gas seal members are used in hydrogen stations for fuel cell vehicles and the like, for example.

Here, gas seal members used in high-pressure hydrogen apparatuses such as hydrogen stations for fuel cell vehicles are required be durable under a high-pressure hydrogen environment under 35 MPa or more and 105 MPa or less, for example. Specifically, a squeezing-out fracture and a blister fracture may occur in a gas seal member in contact with such high-pressure hydrogen, and thus occurrences of such fractures are needed to be suppressed.

Note that the "squeezing-out fracture" is a fracture of a gas seal member caused by squeezing-out of the gas seal member from a certain disposed location (e.g. a groove) due to contact with high-pressure hydrogen and is caught into a gap or the like around the location in which the gas seal member is disposed. Further, the "blister fracture" is a fracture caused by bursting of a gas seal member when hydrogen which penetrates into the gas seal member due to contact with high-pressure hydrogen remaining in the gas seal member expands upon rapid decompression or the like.

Accordingly, for example, PTLs 1 to 3 disclose gas seal members formed by crosslinking of an elastomer composition containing an elastomer and fibrous carbon nanostructures such as carbon nanotubes, to thereby provide gas seal members capable of suppressing both an occurrence of a squeezing-out fracture and an occurrence of a blister fracture.

CITATION LIST

Patent Literature

WO 2016/208203 A
WO 2018/151099 A
WO 2018/180251 A

SUMMARY

Technical Problem

In the meantime, in recent years, for achieving widespread use of fuel cell vehicles, cost reduction in hydrogen stations for fuel cell vehicles or the like is required. However, gas seal members in conventional high-pressure hydrogen apparatuses are required to be exchanged within one year for prevention of an occurrence of a blister fracture due to repetition of contact with high-pressure hydrogen and rapid decompression, which lead to significant maintenance costs.

It would therefore be helpful to provide a high-pressure hydrogen apparatus gas seal member which is excellent in durability and is capable of sufficiently suppressing an occurrence of a blister fracture.

It would also be helpful to provide a high-pressure hydrogen apparatus which is less likely to have an occurrence of a blister fracture of a gas seal member even used for long time, and is thus capable of reducing the maintenance cost.

Solution to Problem

The present inventors conducted diligent investigation to achieve these objectives. Then, the present inventors have found that a high-pressure hydrogen apparatus gas seal member which contains carbon nanotubes having certain properties in a certain state is excellent in durability, and is capable of sufficiently suppressing an occurrence of a blister fracture, to thereby complete the present disclosure.

That is, the present disclosure is directed to advantageously solving the above-mentioned problem, and a high-pressure hydrogen apparatus gas seal member of the present disclosure is made of a crosslinked product of an elastomer composition which comprises an elastomer and fibrous carbon nanostructures having an average length of 100 μm or more and 1000 μm or less, wherein the fibrous carbon nanostructures have an inner diameter of 4.0 nm or less and a surface fractal dimension of 2.3 or more and 3.0 or less. As described above, when the inner diameter and the surface fractal dimension of the fibrous carbon nanostructures in the crosslinked product are within the above ranges in the high-pressure hydrogen apparatus gas seal member made of the crosslinked product of the elastomer composition containing the fibrous carbon nanostructures having an average length of 100 μm or more and 1000 μm or less, the durability can be improved and an occurrence of a blister fracture can be sufficiently suppressed.

In the present disclosure, the "average length", the "inner diameter", and the "surface fractal dimension" of the fibrous carbon nanostructures can be determined by using the methods described in the Examples section.

Further, the present disclosure is directed to advantageously solving the above problem, and a high-pressure hydrogen apparatus gas seal member of the present disclosure is made of a crosslinked product of an elastomer composition which comprises an elastomer and fibrous carbon nanostructures having an average length of 100 μm or more and 1000 μm or less, wherein the fibrous carbon nanostructures have an inner diameter of 4.0 nm or less and a radius of gyration of 50 nm or more and 500 nm or less. As described above, when the inner diameter and the radius of gyration of the fibrous carbon nanostructures in the crosslinked product are within the above ranges in the high-pressure hydrogen apparatus gas seal member made of the crosslinked product of the elastomer composition containing the fibrous carbon nanostructures having an average length of 100 μm or more and 1000 μm or less, the durability can be improved and an occurrence of a blister fracture can be sufficiently suppressed.

In the present disclosure, the "average length", the "inner diameter", and the "radius of gyration" of the fibrous carbon nanostructures can be determined by using the methods described in the Examples section.

Here, in the high-pressure hydrogen apparatus gas seal member of the present disclosure, the fibrous carbon nanostructures preferably have a surface fractal dimension of 2.3 or more and 3.0 or less and a radius of gyration of 50 nm or more and 500 nm or less. When both the surface fractal dimension and the radius of gyration of the fibrous carbon nanostructures are within the above ranges, an occurrence of a blister fracture can be further suppressed.

Further, in the high-pressure hydrogen apparatus gas seal member of the present disclosure, the fibrous carbon nanostructures preferably have an outer diameter of 1 nm or more and 20 nm or less. When the outer diameter of the fibrous carbon nanostructures is within the above range, the durability of the high-pressure hydrogen apparatus gas seal member can be sufficiently increased.

In the present disclosure, the "outer diameter" of the fibrous carbon nanostructures can be determined by using the method described in the Examples section.

Here, in the high-pressure hydrogen apparatus gas seal member of the present disclosure, the elastomer may be at least one rubber selected from the group consisting of nitrile rubbers, hydrogenated nitrile rubbers, ethylene propylene diene rubbers, silicone rubbers, and fluororubbers.

In the high-pressure hydrogen apparatus gas seal member of the present disclosure, the fibrous carbon nanostructures preferably comprise single-walled carbon nanotubes. When the fibrous carbon nanostructures comprising single-walled carbon nanotubes are used, an occurrence of a blister fracture can be further suppressed.

Further, in the high-pressure hydrogen apparatus gas seal member of the present disclosure, the elastomer composition preferably contains the fibrous carbon nanostructures in a proportion of 1 part by mass or more and 10 parts by mass or less per 100 parts by mass of the elastomer. When the content of the fibrous carbon nanostructures is within the above range, the durability of the high-pressure hydrogen apparatus gas seal member can be sufficiently increased and an occurrence of a blister fracture can be further suppressed.

Further, the high-pressure hydrogen apparatus gas seal member of the present disclosure may be used in contact with high-pressure hydrogen at 35 MPa or more and 105 MPa or less.

Additionally, the present disclosure is directed to advantageously solving the above-mentioned problem, and a high-pressure hydrogen apparatus of the present disclosure comprises a vessel filled with high-pressure hydrogen at 35 MPa or more and 105 MPa or less; and any of the above-mentioned high-pressure hydrogen apparatus gas seal members being in contact with the high-pressure hydrogen filled in the vessel. As described above, when the high-pressure hydrogen apparatus gas seal member described above is used, an occurrence of a blister fracture of the gas seal member can be suppressed for long time. Accordingly, the cost required for exchanging gas seal members can be reduced, and the cost required for maintenance can thus be reduced.

Advantageous Effect

According to the present disclosure, it is possible to provide a high-pressure hydrogen apparatus gas seal member which is excellent in durability and is capable of sufficiently suppressing an occurrence of a blister fracture.

Further, according to the present disclosure, it is possible to provide a high-pressure hydrogen apparatus which is less likely to have an occurrence of a blister fracture of a gas seal member even used for long time, and is thus capable of reducing the maintenance cost.

BRIEF DESCRIPTION OF THE DRAWING

In the accompanying drawing.

DETAILED DESCRIPTION

An embodiment of the present disclosure will be described in detail below.

Here, a high-pressure hydrogen apparatus gas seal member according to the present disclosure can be used as a gas seal member such as a packing or a gasket for preventing leakage of gas in hydrogen stations for fuel cell vehicles and the like, for example. In particular, the high-pressure hydrogen apparatus gas seal member according to the present disclosure can suitably be used in a high-pressure hydrogen apparatus where the high-pressure hydrogen apparatus gas seal member is into contact with high-pressure hydrogen. One example of such a high-pressure hydrogen apparatus is a high-pressure hydrogen apparatus including a vessel filled with high-pressure hydrogen and a high-pressure hydrogen apparatus gas seal member that is in contact with the high-pressure hydrogen filled in the vessel and prevents leakage of the high-pressure hydrogen. Here, the "high-pressure hydrogen apparatus" refers to an apparatus in which high-pressure hydrogen (e.g., under a pressure of 35 MPa or more and 105 MPa or less) is handled, specifically, a hydrogen production apparatus (e.g., hydrogen production apparatus 111 in FIG. 1 to be described later), a hydrogen gas compressor (e.g., hydrogen gas compressor (pressor) 112 in FIG. 1 to be described later), a gas storage (e.g., gas storage (pressure storage) 113 in FIG. 1 to be described later), a dispenser (e.g., dispenser 114 in FIG. 1 to be described later), a fuel cell mounted on a vehicle (e.g., vehicle (fuel cell vehicle) 120 in FIG. 1 to be described later), or the like, used in a hydrogen station.

(High-Pressure Hydrogen Apparatus Gas Seal Member)

The high-pressure hydrogen apparatus gas seal member of the present disclosure is made of a crosslinked product of an elastomer composition containing an elastomer and fibrous carbon nanostructures having an average length of 100 μm or more and 1000 μm or less, and the fibrous carbon nanostructures in the crosslinked product satisfy at least one, preferably both of the following (1) and (2).

(1) The inner diameter is 4.0 nm or less, and the surface fractal dimension is 2.3 or more and 3.0 or less.
(2) The inner diameter is 4.0 nm or less, and the radius of gyration is 50 nm or more and 500 nm or less.

The amount of hydrogen in the gas seal member after the high-pressure hydrogen apparatus gas seal member having the above-mentioned properties is brought in contact with high-pressure hydrogen is small. It is hypothesized that this is because of the properties and state of the fibrous carbon nanostructures contained. As a result, the high-pressure hydrogen apparatus gas seal member is capable of favorably suppressing an occurrence of a blister fracture due to repetition of contact with high-pressure hydrogen and rapid decompression, and is excellent in durability.

<Elastomer Composition>

The elastomer composition used for forming the high-pressure hydrogen apparatus gas seal member according to the present disclosure contains an elastomer and fibrous carbon nanostructures having an average length of 100 μm or more and 1000 μm or less, and optionally further contains an additive such as a reinforcing material such as silica, a crosslinking agent, and an antioxidant.

[Elastomer]

Examples of the elastomer in the elastomer composition may include, but not particularly limited to, known elastomers used to form a gas seal member. Specifically, examples of elastomer include, for example, natural rubbers, butadiene rubbers, styrene-butadiene rubbers, isoprene rubbers, nitrile rubbers (NBRs), hydrogenated nitrile rubbers (H-NBRs), fluororubbers, chloroprene rubbers, ethylene propylene rubbers, halogenated butyl rubbers, polyisobutylene rubbers, silicone rubbers, and ethylene-propylene-diene rubbers (EPDMs). These may be used alone or two or more of these may be used in combination.

Of the aforementioned elastomers, the elastomer is preferably at least one rubber selected from the group consisting of nitrile rubbers, hydrogenated nitrile rubbers, ethylene propylene diene rubbers, silicone rubbers, and fluororubbers.

The elastomer contained in a gas seal member used in a hydrogen gas compressor (pressor) (e.g., at −20° C. to 180° C. and 95 MPa) is preferably a fluororubber (e.g., FKM); the elastomer contained in a gas seal member used in a gas storage (pressure storage) (e.g., at −20° C. to 50° C. and 95 MPa) is preferably a nitrile rubber (NBR) or a hydrogenated nitrile rubber (H-NBR); and the elastomer contained in a gas seal member used in a dispenser (e.g., at −40° C. to 50° C. and 82 MPa) is preferably an ethylene propylene diene rubber (EPDM).

[Fibrous Carbon Nanostructures]

Examples of the fibrous carbon nanostructure include, for example, a cylindrical carbon nanostructure such as carbon nanotubes (CNTs) and non-cylindrical carbon nanostructures such as carbon nanostructures or the like composed of a six-membered ring network of carbon formed in a flat cylindrical shape.

Because the durability of the high-pressure hydrogen apparatus gas seal member can be assured by inclusion of the fibrous carbon nanostructures in the elastomer composition, an occurrence of a squeezing-out fracture and an occurrence of a blister fracture can be suppressed.

Here, the fibrous carbon nanostructures blended into the elastomer composition are required to have an average length of 100 μm or more and 1000 μm or less, and the average length of the fibrous carbon nanostructures is preferably 150 μm or more, more preferably 250 μm or more, and is preferably 750 μm or less, more preferably 500 μm or less. When the average length is within any of the above ranges, an occurrence of a blister fracture can be favorably suppressed.

The fibrous carbon nanostructures are not particularly limited, and may be composed only of single-walled carbon nanotubes (single-walled CNTs), may be composed only of multi-walled carbon nanotubes (multi-walled CNTs), may be a mixture of single-walled CNTs and multi-walled CNTs, or may be a mixture of carbon nanotubes (CNTs) and fibrous carbon nanostructures other than CNTs.

Singled-walled CNTs are preferred because they are less likely to allow adsorption of hydrogen and provide a higher reinforcing effect than that of multi-walled CNTs.

In terms of suppressing both an occurrence of a squeezing-out fracture and an occurrence of a blister fracture in a gas seal member formed by using the elastomer composition, the proportion of the single-walled CNTs in 100 pieces of fibrous carbon nanostructure is preferably 50 pieces or more, more preferably 70 pieces or more, even more preferably 90 pieces or more, and particularly preferably 100 pieces.

In the elastomer composition used to form the high-pressure hydrogen apparatus gas seal member of the present disclosure, the fibrous carbon nanostructures are preferably fibrous carbon nanostructures including single-walled CNTs. This is because an occurrence of a blister fracture can be further suppressed by usage of the fibrous carbon nanostructures including the single-welled CNTs.

The fibrous carbon nanostructures preferably exhibit a convex upward shape in a t-plot obtained from an adsorption isotherm. By using the fibrous carbon nanostructures exhibiting a convex upward shape in t-plot obtained from an adsorption isotherm, a gas seal member capable of further suppressing an occurrence of a blister fracture can be formed.

Note that it is more preferable that the fibrous carbon nanostructures have not undergone CNT opening formation treatment and exhibit a convex upward shape in a t-plot.

Adsorption generally refers to a phenomenon in which gas molecules are taken away from the gas phase into a solid surface, and is classified into either physical or chemical adsorption depending on the cause of adsorption. In the nitrogen gas adsorption method used to obtain a t-plot, the physical adsorption is used. In general, when adsorption temperature is constant, the number of nitrogen gas molecules adsorbed to fibrous carbon nanostructures increases with increasing pressure. A plot of the adsorbed amount of nitrogen versus relative pressure (ratio of pressure P at adsorption equilibrium to saturated vapor pressure P0) refers to an "isotherm." An isotherm obtained when the adsorbed amount of nitrogen gas is measured while increasing pressure refers to an "adsorption isotherm" and an isotherm obtained when the adsorbed amount of nitrogen gas is measured while decreasing pressure refers to a "desorption isotherm."

A t-plot is obtained by converting relative pressure to average adsorbed nitrogen gas layer thickness t (nm) in an adsorption isotherm measured by the nitrogen gas adsorption method. Specifically, an average adsorbed nitrogen gas layer thickness t corresponding to a given relative pressure is calculated from a known standard isotherm of average adsorbed nitrogen gas layer thickness t plotted against relative pressure P/P0 and the relative pressure is converted to the corresponding average adsorbed nitrogen gas layer thickness t to obtain a t-plot for the fibrous carbon nanostructures (t-plot method of de Boer et al.).

For a sample having pores on the surface thereof, the growth of the nitrogen gas adsorbed layer is categorized into the following steps (1) to (3) below. The gradient of the t-plot changes in accordance with the steps (1) to (3).

(1) a step in which a single molecular adsorbed layer of nitrogen molecules is formed over the entire surface;

(2) a step in which a multi-molecular adsorbed layer is formed which is accompanied by capillary condensation filling of pores; and (3) a step in which a multi-molecular adsorbed layer is formed at a surface that appears to be non-porous due to the pores being filled by nitrogen.

Further, preferably, although the t-plot of the fibrous carbon nanostructure is on a straight line passing through the origin in an area in which the average thickness t of the adsorbed layer of nitrogen gas is small, as the average thickness t increases, the plot deviates downward from the straight line to form a convex upward shape. The shape of the t-plot described above indicates that the proportion of an internal specific surface area relative to a total specific surface area of the fibrous carbon nanostructure is large and that there are a large number of openings formed in the carbon nanostructure constituting the fibrous carbon nanostructure. As a result of formation of a large number of openings, it is presumed that the gas permeated into the fibrous carbon nanostructure is easy to pass through and exit (i.e. the gas seal member including the fibrous carbon nanostructure is less likely to cause a blister fracture).

A bending point of the t-plot for the fibrous carbon nanostructures is preferably within a range of 0.2≤t (nm) ≤1.5, more preferably within a range of 0.45≤t (nm)≤1.5, and even more preferably within a range of 0.55≤t (nm)≤1.0. When the bending point of the t-plot is positioned within the above described range, the property of the fibrous carbon nanostructure is further improved and thus an occurrence of a blister fracture can be further suppressed.

As used herein, the "position of the bending point" is defined as an intersection point of an approximated straight line A at the aforementioned step (1) and an approximated straight line B at the aforementioned step (3).

Furthermore, in the fibrous carbon nanostructures, a ratio of the internal specific surface area S2 relative to the total specific surface area S1 (S2/S1) obtained from the t-plot is preferably 0.05 or more, more preferably 0.06 or more, and even more preferably 0.08 or more, and is preferably 0.30 or less. When S2/S1 is 0.05 or more and 0.30 or less, the property of the fibrous carbon nanostructures can be further improved, and thus an occurrence of a blister fracture can be further suppressed.

The total specific surface area S1 and the internal specific surface area S2 of the fibrous carbon nanostructures are not particularly limited. However, S1 is preferably 200 m$^2$/g or more and 2000 m$^2$/g or less, more preferably 600 m$^2$/g or more and 1500 m$^2$/g or less. On the other hand, S2 is preferably 10 m$^2$/g or more and 540 m$^2$/g or less.

The total specific surface area S1 and the internal specific surface area S2 of the fibrous carbon nanostructures can be determined from the t-plot of the fibrous carbon nanostructures. In detail, first, the total specific surface area S1 may be determined from the gradient of an approximate straight line corresponding to the step (1), and the external specific surface area S3 may be determined from the gradient of an approximate straight line corresponding to the step (3). The internal specific surface area S2 may then be calculated by subtracting the external specific surface area S3 from the total specific surface area S1.

Measurement of an adsorption isotherm, preparation of a t-plot, and calculation of the total specific surface area S1 and the internal specific surface area S2 based on the t-plot analysis for the fibrous carbon nanostructures may be made using, for example, BELSORP®-mini (BELSORP is a registered trademark in Japan, other countries, or both), a commercially available measurement instrument (manufactured by Bel Japan Inc.).

The BET specific surface area of the fibrous carbon nanostructures is preferably 200 m$^2$/g or more, more preferably 600 m$^2$/g or more, and even more preferably 1250 m$^2$/g or more, and is preferably 2000 m$^2$/g or less and even more preferably 1500 m$^2$/g or less. When the BET specific surface area of the fibrous carbon nanostructures is within any of the above ranges, it is possible to further suppress an occurrence of a blister fracture by appropriately causing the fibrous carbon nanostructures to be dispersed in the cross-linked product while providing a sufficient reinforcing effect. As used herein, "BET specific surface area" refers to a nitrogen adsorption specific surface area measured by the BET method.

Further, the fibrous carbon nanostructures may be obtained by the subsequently described super growth method as an aggregate (aligned aggregate) that, on a substrate having a catalyst layer for carbon nanotube growth at the surface thereof, is aligned so as to be substantially perpendicular to the substrate. In this situation, it is preferable that the mass density of the fibrous carbon nanostructures as the aggregate is 0.002 g/cm$^3$ or more and 0.2 g/cm$^3$ or less. When the mass density is 0.2 g/cm$^3$ or less, binding between fibrous carbon nanostructures is weakened, and thus the fibrous carbon nanostructures can be dispersed homogeneously in the elastomer. A mass density of 0.002 g/cm$^3$ or more improves the unity of the fibrous carbon nanostructures thus preventing the fibrous carbon nanostructures from becoming unbound and making the fibrous carbon nanostructures easier to handle.

The fibrous carbon nanostructures having the properties described above can be efficiently produced for example by forming a catalyst layer on a substrate surface by wet process in the super growth method (see WO 2006/011655 A) wherein during synthesis of CNTs through chemical vapor deposition (CVD) by supplying a feedstock compound and a carrier gas onto a substrate having thereon a catalyst layer for carbon nanotube production, the catalytic activity of the catalyst layer is significantly improved by providing a trace amount of an oxidizing agent (catalyst activating material) in the system. Hereinafter, carbon nanotubes obtained by the super growth method may also be referred to as "SGCNTs."

The fibrous carbon nanostructures produced by the super growth method may be composed of SGCNTs only, or may be composed of SGCNTs and non-cylindrical carbon nanostructures. Specifically, the fibrous carbon nanostructures may include single-walled or multi-walled flattened cylinder-shaped carbon nanostructures (hereinafter, also referred to as "graphene nanotapes (GNTs)") having a tape-shaped section at which inner walls are in proximity or adhered to each other along the entire length.

In the present specification, "having a tape-shaped section along the entire length" means "having a tape-shaped section continuously or non-continuously along 60% or more, preferably 80% or more, and even more preferably 100% of the longitudinal direction length (entire length)".

The GNT's flattened cylindrical structure and the presence of a tape portion where inner walls are in close proximity to each other or bonded together in the GNT can be confirmed for example as follows: GNT and fullerene (C60) are sealed into a quartz tube and subjected to heat treatment under reduced pressure (fullerene insertion treatment) to form a fullerene-inserted GNT, followed by observation under transmission electron microscopy (TEM) of the fullerene-inserted GNT to confirm the presence of part in the GNT where no fullerene is inserted (tape portion).

The content of the fibrous carbon nanostructures in the elastomer composition used for forming the high-pressure hydrogen apparatus gas seal member is preferably 0.5 parts by mass or more, more preferably 1 part by mass or more, and is preferably 30 parts by mass or less, more preferably 10 parts by mass or less, and even more preferably 5 parts by mass or less, per 100 parts by mass of the elastomer. When the content of the fibrous carbon nanostructures is equal to or more than any of the above lower limits, the durability of the high-pressure hydrogen apparatus gas seal member can be sufficiently increased. Further, when the content of the fibrous carbon nanostructures is equal to or less than any of the above upper limits, escape of hydrogen from the gas seal member is promoted and an occurrence of a blister fracture can be further suppressed.

[Additives]

Examples of additives that can be optionally blended in the elastomer composition used for foaming the high-pressure hydrogen apparatus gas seal member may include, but not particularly limited to, known additives such as reinforcing materials, crosslinking agents, crosslinking promoters, crosslinking aids, and antioxidants.

In particularly, reinforcing materials are not particularly limited, and silica or carbon black may be used.

Specifically, crosslinking agents are not particularly limited, and known crosslinking agent capable of crosslinking an elastomer contained in the elastomer composition can be used. More specifically, for example, sulfur, peroxide-based crosslinking agents (e.g., 1,3-bis(t-butyl peroxyisopropyl) benzene)), triallyl isocyanurate or the like may be used as a crosslinking agent.

Further, crosslinking promoters are not particularly limited, and di-2-benzothiazolyl disulfide, tetramethylthiuram disulfide, or the like can be used, for example.

Further, crosslinking aids are not particularly limited, and zinc oxide, stearic acid or the like may be used, for example.

Further, antioxidants are not particularly limited, and amine-based antioxidants (e.g., 4,4'-bis(a,a-dimethylbenzyl) diphenylamine) or imidazole-based antioxidants (e.g., zinc salt of 2-mercaptobenzimidazole) can be used.

These additives may be used alone or two or more of such additives may be used in combination. Any amount of additives may be blended as long as expression of the desired effects is ensured.

[Preparation Method]

The elastomer composition used for forming the high-pressure hydrogen apparatus gas seal member can be prepared by mixing or kneading, for example, an elastomer, fibrous carbon nanostructures, and an additive which is an optional component, at a desired blending ratio.

Specifically, the elastomer composition is not particularly limited, and can be prepared by obtaining a mixture (master batch) of an elastomer and fibrous carbon nanostructures and thereafter kneading the resultant mixture (master batch) and an additive which is an optional component.

The mixture (master batch) of the elastomer and the fibrous carbon nanostructures can be prepared by any of mixing methods that enable dispersion of the fibrous carbon nanostructures into the elastomer. Specifically, without any limitations, the above mixture (master batch) can be prepared as follows: (i) a dispersion liquid is obtained by dispersing fibrous carbon nanostructures into an organic solvent by dispersion treatment using, for example, an ultrasonic homogenizer or a wet jet mill, after an elastomer is added and mixed to the dispersion liquid to prepare a slurry wherein the elastomer is dispersed, and the organic solvent is removed from the obtained dispersion liquid as the slurry; or (ii) a dispersion liquid is obtained by dispersing fibrous carbon nanostructures into an organic solvent by dispersion treatment using, for example, an ultrasonic homogenizer or a wet jet mill, an elastomer is added and mixed to prepare a slurry wherein the elastomer is dispersed, the organic solvent is removed from the dispersion liquid as the slurry, and then a kneading operation is performed once or more times by further adding the elastomer to the mixture of the elastomer and the fibrous carbon nanostructures followed by kneading.

In other words, the method of obtaining a mixture (master batch) of an elastomer and fibrous carbon nanostructures may be (i) a method in which the entire elastomer to be contained in the finally produced elastomer composition and fibrous carbon nanostructures are mixed in a batch and an organic solvent is removed, or (ii) a method in which a part of an elastomer to be contained in the finally produced elastomer composition and fibrous carbon nanostructures are mixed, an organic solvent is removed, and a kneading operation is performed once or more times by further adding the elastomer to the obtained mixture followed by kneading.

Removal of the organic solvent can be accomplished for example by solidification, casting or drying. Kneading can be performed by using, for example, a mixer, a single-screw kneader, a twin-screw kneader, a roll, a Brabender, an extruder or the like.

<Crosslinking>

The high-pressure hydrogen apparatus gas seal member can be obtained by molding the above-described elastomer composition into a desired shape and causing it to be crosslinked. Specifically, the gas seal member can be formed, for example, by charging the elastomer composition into a mold and causing the composition to be crosslinked. The high-pressure hydrogen apparatus gas seal member formed by using the elastomer composition contains components derived from the components contained in the elastomer composition at the same ratio as in the elastomer composition. In other words, for example, in the case where the elastomer composition contains a crosslinking agent, the resulting gas seal member contains a cross-linked elastomer component and the fibrous carbon nanostructures, and optionally further contains an additive such as a reinforcing material.

The high-pressure hydrogen apparatus gas seal member may be formed into any shape depending on the application. The high-pressure hydrogen apparatus gas seal member may, for example, be shaped into an annular gas seal member (O-ring) or a hollow disk-like gas seal member.

Further, without any particular limitation, the conditions for molding and crosslinking are preferably, but not particularly limited to, conditions of a temperature of 140° C. to 250° C., a pressure of 1 MPa to 20 MPa, and a time duration of 1 minute to 180 minutes, for example.

<Properties of Crosslinked Product>

In the Crosslinked Product of the Above-Mentioned Elastomer composition constituting the high-pressure hydrogen apparatus gas seal member, the fibrous carbon nanostructures are required to have an inner diameter of 4.0 nm or less, and are further required to have a surface fractal dimension of 2.3 or more and 3.0 or less and/or a radius of gyration of 50 nm or more and 500 nm or less.

[Inner Diameter]

The inner diameter of the fibrous carbon nanostructure in the crosslinked product is required to be greater than 0 nm and 4.0 nm or less, preferably 2.0 nm or more, more preferably 3.0 nm or more, and is preferably 3.8 nm or less. When the inner diameter of the fibrous carbon nanostructure is within any of the above ranges, escape of hydrogen from the gas seal member is promoted and an occurrence of a blister fracture can be further suppressed.

[Outer Diameter]

The outer diameter of the fibrous carbon nanostructures in the crosslinked product is preferably 1 nm or more and more preferably 3.0 nm or more, and is preferably 20 nm or less and more preferably 5 nm or less. When the outer diameter of the fibrous carbon nanostructures is within any of the above ranges, escape of hydrogen from the gas seal member is promoted and an occurrence of a blister fracture can be further suppressed.

[Surface Fractal]

Further, the surface fractal of the fibrous carbon nanostructures in the crosslinked product is required to be 2.3 or more and 3.0 or less, and is preferably 2.4 or more and 3.0 or less. When the surface fractal of the fibrous carbon nanostructure is within any of the above ranges, escape of hydrogen from the gas seal member is promoted and an occurrence of a blister fracture can be further suppressed.

[Radius of Gyration]

The radius of gyration of the fibrous carbon nanostructures in the crosslinked product is required to be 50 nm or more and 500 nm or less, and is preferably 100 nm or more and 400 nm or less. When the radius of gyration of the fibrous carbon nanostructure is within any of the above ranges, escape of hydrogen from the gas seal member is promoted and an occurrence of a blister fracture can be further suppressed.

Note that the surface fractal and the radius of gyration can be adjusted, for example, by changing the properties of the fibrous carbon nanostructures to be used and the dispersion state of the fibrous carbon nanostructures in the elastomer composition to be crosslinked.

(High-Pressure Hydrogen Apparatus)

A high-pressure hydrogen apparatus of the present disclosure includes a vessel in which high-pressure hydrogen at 35 MPa or more and 105 MPa or less is filled, and the high-pressure hydrogen apparatus gas seal member of the present disclosure. The gas seal member is in contact with the high-pressure hydrogen filled in the vessel.

The pressure of the high-pressure hydrogen may be set to 60 MPa or more or 70 MPa or more, for example. The pressure of the high-pressure hydrogen may be set to 100 MPa or less or 95 MPa or less, for example.

Examples of such a high-pressure hydrogen apparatus include a hydrogen production apparatus (e.g., hydrogen production apparatus 111 in FIG. 1 to be described later), a hydrogen gas compressor (e.g., hydrogen gas compressor (pressor) 112 in FIG. 1 to be described later), a gas storage (e.g., gas storage (pressure storage) 113 in FIG. 1 to be described later), a dispenser (e.g., dispenser 114 in FIG. 1 to be described later), and a fuel cell mounted on a vehicle (e.g., a vehicle (fuel cell vehicle) 120) in FIG. 1 to be described later), used in a hydrogen station, for example.

Figure 1:
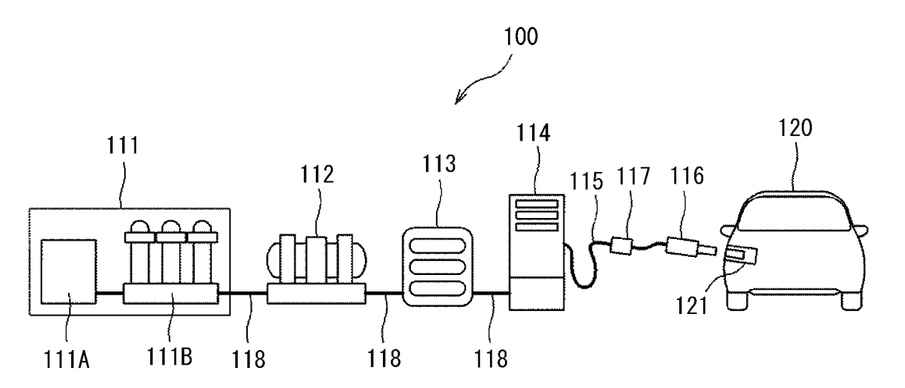
FIG. 1 is an explanatory diagram illustrating a schematic configuration of a hydrogen station.

FIG. 1 is a schematic diagram illustrating the configuration of a hydrogen station.

In FIG. 1, a hydrogen station 100 includes a hydrogen generator 111, a hydrogen gas compressor (pressor) 112, a gas storage (pressure storage) 113, and a dispenser 114, and these facilities are connected to each other by hydrogen pipes 118. In addition, piping devices (not illustrated) such as valves and joints are disposed as needed in the middle of each hydrogen pipe 118.

At an on-site type hydrogen station 100, fuel (naphtha or kerosene) is supplied from outside of the hydrogen station 100, and the fuel is used to produce hydrogen in the hydrogen generator 111 which includes a fuel reformer 111A and a hydrogen purifier 111B for increasing the purity of hydrogen.

Hydrogen produced in the hydrogen production apparatus 111 is adjusted to high-pressure hydrogen at a certain temperature (e.g., −20° C. to 180° C.) and a certain pressure (e.g., 95 MPa) in the hydrogen gas compressor (pressor) 112. The compressed hydrogen is supplied to the vehicle (fuel cell vehicle) 120 that includes a hydrogen tank (not illustrated) via the gas storage (pressure storage) 113 for temporarily storing the high-pressure hydrogen and the dispenser 114 for supplying the high-pressure hydrogen stored in the gas storage 113 to the vehicle (fuel cell vehicle).

In this process, supply of hydrogen from the dispenser 114 to the vehicle (fuel cell vehicle) 120 is achieved by means of the pressure difference of hydrogen. For example, the temperature and the pressure in the gas storage (pressure storage) 113 are set to −20° C. to 50° C. and 95 MPa, respectively, and the temperature and pressure in the dispenser 114 are set to −40° C. to 50° C. and 82 MPa, respectively, so that hydrogen is filled into the hydrogen tank in the vehicle (fuel cell vehicle) 120 by means of the pressure difference.

The dispenser 114 includes a hydrogen supply hose 115 for supplying hydrogen to the hydrogen tank in the vehicle (fuel cell vehicle) 120. A hydrogen supply plug 116 which is detachably connectable to a receptacle 121 of the vehicle 120 is attached to the hydrogen supply hose 115. Connection of the hydrogen supply plug 116 to the receptacle 121 enables hydrogen to be supplied to the vehicle (fuel cell vehicle) 120.

Further, in the middle of the hydrogen supply hose 115, an emergency disengagement coupling 117 is disposed. Thus, in case of an emergency (for example, when the vehicle (fuel cell vehicle) 120 has erroneously started), supply of hydrogen from the hydrogen station 100 side to the vehicle (fuel cell vehicle) 120 side is stopped by an operation of the emergency disengagement coupling 117.

Note that the high-pressure hydrogen apparatus gas seal member of the present disclosure is disposed at connections between each apparatus (the hydrogen production apparatus 111, the hydrogen gas compressor (pressor) 112, the gas storage (pressure storage) 113, or the dispenser 114) and a hydrogen pipe 118; between a vessel main body and a lid in each apparatus (the hydrogen production apparatus 111, the hydrogen gas compressor (pressor) 112, the gas storage (pressure storage) 113, or the dispenser 114); and so forth.

EXAMPLES

The present disclosure will now be described below based on examples. However, present disclosure is not limited to the examples disclosed herein. In the following description, "%" and "parts" used in expressing quantities are by mass, unless otherwise specified.

In Examples and Comparative Examples, the average length of the carbon nanotubes, the outer diameter, the inner diameter, the surface fractal dimension, and the radius of gyration of the carbon nanotubes in the crosslinked product, and the amount of hydrogen C2 in the crosslinked product were measured or evaluated using the following methods.

<Average Length of Carbon Nanotubes>

Powdery carbon nanotube was made to be attached and fixed on a carbon tape, and the length direction of the carbon nanotubes was observed under a scanning electron microscope (product name "SU3500", manufactured by Hitachi High-Technologies, Ltd.), under an accelerating voltage of 1.5 kV to obtain a secondary electron image. The obtained image was subjected to image analysis using image processing software (product name "WinROOF2018", developed by Mitani Corporation), and the lengths of the carbon nanotube were measured. The lengths of twenty randomly-selected powdery carbon nanotubes were analyzed in the same manner to measure the lengths of the carbon nanotubes, and the number average value was determined to be used as the average length of the carbon nanotubes.

<Outer Diameter and Inner Diameter of Carbon Nanotubes in Crosslinked Product>

A sheet-like crosslinked product produced was set so that the angle between the X-ray source direction and the sheet surface was perpendicular, and was subjected to a small-angle X-ray scattering (SAXS) measurement under the following conditions. Then data processing was performed as described below, and the outer diameter and the inner diameter of the carbon nanotube were obtained.

[Conditions for Small Angle X-Ray Scattering Measurement]
- Beamline: Spring-8 BL08B2, Japan Synchrotron Radiation Research Institute
- X-ray wavelength: 1.5 angstrom
- Camera length (distance from the sample to the detector): 1.5 m
- q range: 0.0061 to 4 nm$^{-1}$
- X-ray irradiation time: 60 seconds
- Detector: PILATUS-1M

[Data Processing of Data Obtained by Small-Angle X-Ray Scattering Measurement]

A scattered image obtained by the small-angle X-ray scattering measurement according to the above procedure was unidimensionalized by determining an annular average from −90 to 180° to obtain a scattered profile. The outer diameter and the inner diameter of the carbon nanotubes were obtained by fitting the scatter profile obtained across the q range in a range of 0.008 nm$^{-1}$ to 0.3 nm$^{-1}$ according to the function equation of the hollow-cylinder model (Expression 1, Source of the expression: S. R. Kline, J. Appl. Crystallogr., 39, 895 (2006)) using Igor Pro? (developed by WaveMetrics Inc.) as analysis software:

$$P(q) = \text{scale} \times \pi(R_{shell}^2 - R_{core}^2)L \times$$
$$(\Delta\rho)^2 \int_0^1 \Psi^2\left[q, R_{shell}(1-x^2)^{1/2}, R_{core}(1-x^2)^{1/2}\right]\left(\frac{\sin(qHx)}{qHx}\right)^2 dx$$
$$\Psi(q, y, z) = \frac{1}{1-\gamma^2}\left[\Lambda(qy) - \gamma^2\Lambda(qz)\right]$$
$$\Lambda(w) = 2J_1(w)/w$$
$$\Upsilon = R_{core}/R_{shell}$$

(Expression 1)

where scale is an arbitrary factor, $R_{core}$ is the radius of the inner diameter of the tube, $R_{shell}$ is the radius of the outer diameter of the tube, L is the length of the tube, and q is the wave number (nm$^{-1}$). The outer diameter of the carbon nanotube was determined to be twice the value of $R_{shell}$, and the inner diameter of the carbon nanotube was determined to be twice the value of $R_{core}$.

<Surface Fractal Dimension and Radius of Gyration of Carbon Nanotubes in Crosslinked Product>

A sheet-like crosslinked product produced was set so that the angle between the X-ray source direction and the sheet surface was perpendicular, and was subjected to an ultra-small-angle X-ray scattering (USAXS) measurement under the following conditions. The surface fractal dimension and the radius of gyration of the carbon nanotubes were then determined by performing data processing as follows.

[Conditions for Ultra-Small Angle X-Ray Scattering Measurement]
- Beamline: Spring-8 BL08B2, Japan Synchrotron Radiation Research Institute
- X-ray wavelength: 1.5 angstrom
- Camera length (distance from the sample to the detector): 16 m
- q range: 0.0005 to 0.04 nm$^{-1}$
- X-ray irradiation time: 60 seconds
- Detector: PILATUS-1M

[Data Processing of Data Obtained by Ultra-Small-Angle X-Ray Scattering Measurement]

A scattered image obtained by the ultra-small-angle X-ray scattering measurement according to the above procedure was unidimensionalized by determining an annular average from −90 to 180° to obtain a scattered profile. The surface fractal dimension $D_s$ and the radius of gyration $R_{g,i}$ (nm) of carbon nanotubes were obtained by fitting the scatter profile obtained across the q range in a range of 0.0005 nm$^{-1}$ to 0.2 nm$^{-1}$ using the Beaucage modeling equation (the following Expression 2) using analysis software Igor Pro? (developed by WaveMetrics Inc.) as analysis software:

$$I(q) = Bkgd. + \sum_{i=1}^{N}\left[G_i\exp\left(-\frac{q^2 R_{g,i}^2}{3}\right) + B_i\left[\frac{\text{erf}\left(\frac{qR_{g,i}}{\sqrt{6}}\right)^3}{q}\right]^{P_i}\right]$$

(Expression 2)

where I(q) is the scattering intensity, q is the wave number (nm$^{-1}$), $P_i$ is the fractal dimension associated with each hierarchy, and N is the number of hierarchies and N=2. The fitting was carried out so that $(\chi^2/N)^{1/2}$ representing the error between the actual measured value and the calculated value of scattering profile was 5 or less. Fitting is considered to be satisfactory when $(\chi^2/N)^{1/2}$ is 5 or less. A value of p with a higher q range than the radius of gyration $R_{g,i}$ reflects the fractal nature of the surface, and the surface fractal dimension $D_s$ was obtained from the following Expression 3.

$$D_s = 6 - p$$

(Expression 3)

A surface fractal dimension $D_s$ of 2 represents a fully smooth two-dimensional surface. As the surface is roughened, $D_s$ approaches 3 indicative of a three-dimensional structure. The radius of gyration $R_{g,i}$ (nm) represents the CNT bundle radius, and a smaller $R_{g,i}$ indicates a higher degree of defiberization of CNTs.

<Hydrogen Content C2>

A sheet-like crosslinked product produced was exposed to hydrogen gas under a pressure of 90 MPa for 24 hours. Thereafter, the change over time of the amount of hydrogen released was measured by gas chromatography on the test piece after the hydrogen exposure using a thermal desorption gas analyzer at a temperature of 30° C. The hydrogen release profile was approximated by the following Expression 4 assuming that the amount of saturated hydrogen and the diffusion coefficient were unknown constants, and the amount of hydrogen C2 was determined by extrapolating the amount of hydrogen in the second component term at t=0. Here, an occurrence of a blister fracture reduces as the hydrogen amount C2 decreases.

$$C_{H,R}(t) = \frac{32}{\pi^2} \times C_{1,H0} \times \left\{\sum_{n=0}^{\infty}\frac{\exp[-(2n+1)^2\pi^2 D_1 t/l^2]}{(2n+1)^2}\right\} \times$$
$$\left\{\sum_{n=1}^{\infty}\frac{\exp[[-D_1\beta_n^2 t/\rho^2]]}{\beta_n^2}\right\} + \frac{32}{\pi^2} \times C_{2,H0} \times$$
$$\left\{\sum_{n=0}^{\infty}\frac{\exp[-(2n+1)^2\pi^2 D_2 t/l^2]}{(2n+1)^2}\right\} \times \left\{\sum_{n=1}^{\infty}\frac{\exp[[-D_2\beta_n^2 t/\rho^2]]}{\beta_n^2}\right\}$$

(Expression 4)

t: Elapsed time after decompression
$C_{H,R}(t)$: The amount of residual hydrogen at time t
$C_{1,H0}$: The equilibrium hydrogen amount of the first component
$D_1$: The diffusion coefficient of the first component
$C_{2, H0}$: The equilibrium hydrogen amount of the second component
$D_2$: The diffusion coefficient of the second component
ρ: The radius of the test piece after hydrogen exposure l: The thickness of the test piece after hydrogen exposure
$\beta_n$: The root of the 0th-order Bessel function Example 1

<Preparation of Carbon Nanotubes>
Carbon nanotubes (SGCNTs) were prepared by the super growth method in accordance with the description in WO 2006/011655 A. When SGCNTs were prepared, a catalyst layer was formed on a substrate surface through a wet process, and a feedstock gas containing acetylene as a main component was used, wherein the acetylene concentration of the feedstock gas was 5%.

The resultant SGCNTs were composed mainly of single-walled CNTs. In the measurement using a Raman spectrophotometer, a radial breathing mode (RBM) spectrum was observed in a low-wavenumber area from 100 to 300 cm$^{-1}$, which is characteristic to a single-walled CNT. Further, the BET specific surface area of SGCNTs measured with a BET specific surface area meter (BELSORP®-max (manufactured by Bel Japan Inc.) was 1325 m$^2$/g (unopened). Moreover, when the t-plot of the SGCNTs was measured with "BELSORP®-mini" manufactured by Bel Japan Inc., the t-plot exhibited a convex upward shape. The ratio of S2/S1 was 0.09 and the position t of the bending point was 0.6 nm. Furthermore, the average length of the SGCNTs was 290 µm.

<Preparation of Elastomer Composition>
[Preparation of Mixture (Master Batch)]
To 1900 g of methyl ethyl ketone (MEK) as an organic solvent, 1 g of the SGCNTs was added, and the mixture was stirred for 10 minutes using an agitator (LABOLUTION® (LABOLUTION is registered trademark in Japan, other countries, or both), manufactured by PRIMIX Corporation). Furthermore, ultrasonic irradiation was performed for 1 hour at a power of 300 W and a frequency of 20,000 KHz using a probe-type ultrasonic apparatus (product name "UX300", manufactured by Mitsui Electric Co., Ltd.) to obtain dispersions of the SGCNTs and MEK.

Next, 100 g of a nitrile rubber (acrylonitrile butadiene rubber, product name "Nipol® DN3350" (Nipol is a registered trademark in Japan, other countries, or both), manufactured by Zeon Corporation) as an elastomer was added to the dispersion, and was stirred for 24 hours to dissolve the acrylonitrile butadiene rubber, thereby obtaining a slurry of the acrylonitrile butadiene rubber, the SGCNTs, and MEK. The Mooney viscosity (ML$_{1+4}$, 100° C.) of the acrylonitrile butadiene rubber measured in accordance with JIS K6300 was 49.8. Thereafter, the resultant dispersion was dropped onto 6,000 g of cyclohexane to be coagulated to obtain a black solid substance. The obtained black solid substance was then dried at 60° C. for 12 hours under a reduced pressure to obtain a mixture (master batch) of the acrylonitrile butadiene rubber and the SGCNTs.

[Kneading]
Using an open roll at 50° C., 101 g of the mixture (master batch) of 100 g of the acrylonitrile butadiene rubber and 1 g of the SGCNTs, 5.0 g of zinc oxide (zinc oxide No. 1) and 1.0 g of stearic acid (product name "bead stearic acid Tsubaki", manufactured by NOF Corporation) as crosslinking aids, 0.5 g of sulfur (sulfur #325) as a crosslinking agent, and 1.5 g of di-2-benzothiazolyl disulfide (product name "Nocceler DM-P", manufactured by OUCHI SHINKO CHEMICAL INDUSTRIAL CO., LTD.) and 1.5 g of tetramethylthiuram disulfide (product name "Nocceler TT-P", manufactured by OUCHI SHINKO CHEMICAL INDUSTRIAL CO., LTD.) as crosslinking promoters were kneaded to obtain an elastomer composition.

<Preparation of Sheet-Like Crosslinked Product>
The resultant elastomer composition was charged into a mold and crosslinked at 160° C. and 10 MPa for 10 minutes to obtain a sheet-like crosslinked product (length: 150 mm, width: 150 mm, thickness 2 mm).

Then, using the obtained sheet-like crosslinked product, the outer diameter, the inner diameter, the surface fractal dimension, and the radius of gyration of the carbon nanotubes in the crosslinked product, and the hydrogen amount C2 were measured. The results are summarized in Table 1.

Example 2

An elastomer composition was prepared in the same manner as in Example 1 except that 5 g of SGCNTs was used instead of 1 g of SGCNTs in the preparation of the master batch, and a sheet-like crosslinked product was produced. Evaluations were made in the same way as in Example 1. The results are summarized in Table 1.

Example 3

In the preparation of carbon nanotubes, the carbon nanotubes were synthesized by changing the ethylene concentration in the feedstock gas to 7%. The resultant SGCNTs had an average length of 491 µm, and a BET specific surface area measured with the BET specific surface area meter (BELSORP®-max (manufactured by Bel Japan Inc.) was 1327 m$^2$/g (unopened). Further, an elastomer composition was prepared in the same manner as in Example 2 except that the ultrasonic irradiation time of the probe-type ultrasonic apparatus in the preparation of the master batch was 3 hours, and a sheet-like crosslinked product was prepared. Evaluations were made in the same way as in Example 1. The results are summarized in Table 1.

Example 4

An elastomer composition was prepared in the same manner as in Example 2 except that the SGCNTs used in Example 3 were used in the preparation of the master batch, and a sheet-like crosslinked product was prepared. Evaluations were made in the same way as in Example 1. The results are summarized in Table 1.

Example 5

An elastomer composition was prepared in the same manner as in Example 1 except that 10 g of MWCNTs (product name "K-nanos 100P", manufactured by Kumho Petrochemical, having a BET specific surface area of 251 m$^2$/g and a length of 150 µm) was used instead of SGCNTs, and a sheet-like crosslinked product was produced. Evaluations were made in the same way as in Example 1. The results are summarized in Table 1.

Comparative Example 1

<Preparation of Carbon Nanotube Dispersion Liquid>
Carbon nanotubes were synthesized in the same manner as in Example 1 except that the ethylene concentration in the feedstock gas was changed to 6%. The resultant SGCNTs had an average length of 350 and a BET specific surface area measured with the BET specific surface area meter (BEL-SORP®-max (manufactured by Bel Japan Inc.) was 1050 m²/g (unopened).

<Preparation of Elastomer Composition>

[Preparation of Mixture (Master Batch)]

To 760 g of methyl ethyl ketone as an organic solvent, 40 g of a nitrile rubber (acrylonitrile butadiene rubber, product name "Nipol® DN3350", manufactured by Zeon Corporation) as an elastomer was added, and the mixture was stirred for 24 hours to dissolve the acrylonitrile butadiene rubber.

Subsequently, 8 g of SGCNTs were added to the resultant acrylonitrile butadiene rubber solution, and the mixture was stirred for 10 minutes with a stirrer (LABOLUTION® manufactured by PRIMIX Corporation). Moreover, the solution obtained by adding the SGCNTs was subjected to one path of a dispersion treatment at 100 MPa with a wet jet mill (product name: "L-ES007", manufactured by Yoshida Kikai Co., Ltd.). Thereafter, the resultant liquid treated with dispersion was dropped onto 3,200 g of isopropanol to be coagulated to obtain a black solid substance. The obtained black solid substance was then dried at 60° C. for 12 hours under a reduced pressure to obtain a mixture (primary master batch) of the acrylonitrile butadiene rubber and the SGCNTs.

Thereafter, using an open roll at 50° C., 48 g of the mixture (primary master batch) of 40 g of the acrylonitrile butadiene rubber and 8 g of the SGCNTs and 30 g of the acrylonitrile butadiene rubber were kneaded for 10 minutes to prepare a secondary master batch.

Thereafter, using an open roll at 50° C., 78 g of the mixture (secondary master batch) of 70 g of the acrylonitrile butadiene rubber and 8 g of the SGCNTs and 30 g of the acrylonitrile butadiene rubber were further kneaded for 10 minutes to prepare a tertiary master batch.

[Kneading]

Thereafter, using an open roll at 50° C., the mixture (tertiary master batch) of 100 g of the acrylonitrile butadiene rubber and 8 g of the SGCNTs, 5.0 g of zinc oxide (zinc oxide No. 1) and 1.0 g of stearic acid (product name "bead <Preparation of Sheet-Like Crosslinked Product>

A sheet-like crosslinked product was prepared in the same manner as in Example 1. Evaluations were made in the same way as in Example 1. The results are summarized in Table 1.

Comparative Example 2

In the preparation of carbon nanotubes, the carbon nanotubes were synthesized by changing the ethylene concentration in the feedstock gas to 2%. The resultant SGCNTs had an average length of 60 and a BET specific surface area measured with the BET specific surface area meter (BEL-SORP®-max (manufactured by Bel Japan Inc.) was 924 m²/g (unopened).

Then, an elastomer composition was prepared in the same manner as in Example 2 except the SGCNTs were used, and a sheet-like crosslinked product was produced. Evaluations were made in the same way as in Example 1. The results are summarized in Table 1.

Comparative Example 3

An elastomer composition was prepared in the same manner as in Example 3 except that ultrasonic irradiation with the probe-type ultrasonic apparatus was not performed in the preparation of the master batch, and a sheet-like crosslinked product was prepared. Evaluations were made in the same way as in Example 1. The results are summarized in Table 1.

Comparative Example 4

An elastomer composition was prepared in the same manner as in Example 1 except that 10 g of MWCNTs (product name "NC7000" manufactured by Nanocyl SA, BET specific surface area: 250 m²/g, length: 1.5 μm) was used as carbon nanotubes instead of SGCNTs, and a sheet-like crosslinked product was produced. Evaluations were made in the same way as in Example 1. The results are summarized in Table 1.

TABLE 1

|  |  |  | Example 1 | Example 2 | Example 3 | Example 4 | Example 5 | Comp. Example 1 | Comp. Example 2 | Comp. Example 3 | Comp. Example 4 |
|---|---|---|---|---|---|---|---|---|---|---|---|
|  | Elastomer | parts by mass | 100 | 100 | 100 | 100 | 100 | 100 | 100 | 100 | 100 |
| Fibrous carbon nanostructure | Type | — | SGCNT | SGCNT | SGCNT | SGCNT | MWCNT | SGCNT | SGCNT | SGCNT | MWCNT |
|  | Content | parts by mass | 1 | 5 | 5 | 5 | 10 | 8 | 5 | 5 | 10 |
|  | Outer diameter | nm | 3.9 | 3.9 | 4.0 | 4.0 | 13.3 | 5.1 | 4.9 | 4.0 | 11.2 |
|  | Inner diameter | nm | 3.6 | 3.6 | 3.4 | 3.4 | 2.4 | 4.5 | 3.9 | 3.4 | 3.5 |
|  | Average length | μm | 290 | 290 | 491 | 491 | 150 | 350 | 60 | 491 | 1.5 |
|  | Surface fractal dimension | — | 2.5 | 2.4 | 3.0 | 2.4 | 2.4 | 2.2 | 2.5 | 2.0 | 2.4 |
|  | radius of gyration | nm | 379 | 385 | 101 | 378 | 216 | 281 | 226 | 562 | 190 |
| Evaluation | Amount of hydrogen C2 | wt · ppm | 1753 | 1776 | 1749 | 1749 | 1953 | 2002 | 2465 | 2090 | 2507 | stearic acid Tsubaki", manufactured by NOF Corporation) as crosslinking aids, 0.5 g of sulfur (sulfur #325) as a crosslinking agent, and 1.5 g of di-2-benzothiazolyl disulfide (product name "Nocceler DM-P", manufactured by OUCHI SHINKO CHEMICAL INDUSTRIAL CO., LTD.) and 1.5 g of tetramethylthiuram disulfide (product name "Nocceler TT-P", manufactured by OUCHI SHINKO CHEMICAL INDUSTRIAL CO., LTD.) as crosslinking promoters were kneaded to obtain an elastomer composition.

It can be understood from Table 1 that the amount of hydrogen C2 was small, and a gas seal member having high durability in which an occurrence of a blister fracture was sufficiently suppressed was obtained in Examples 1 to 5 including a certain fibrous carbon nanostructures.

In contrast, it is understood that the amount of hydrogen C2 increased and the durability of the gas seal member was insufficient in Comparative Example 1 in which the inner diameter and the surface fractal dimension of the fibrous carbon nanostructures were outside the certain ranges. Further, it is understood that the amount of hydrogen C2 increased and the durability of the gas seal member was insufficient in Comparative Examples 2 and 4 in which the average length of the fibrous carbon nanostructures was less than the certain length. It is hypothesized that this is because the proportion of open ends increased and the amount of hydrogen adsorbed to the internal pores of the fibrous carbon nanostructures increased. Further, it is understood that the amount of hydrogen C2 increased and the durability of the gas seal member was insufficient in Comparative Example 3 in which the surface fractal dimension and the radius of gyration of the fibrous carbon nanostructures in the crosslinked product were out of the certain ranges. It is hypothesized that this is because defibrillation of the carbon nanotubes was insufficient and hence the amount of hydrogen adsorbed between carbon nanotube bundles increased.

INDUSTRIAL APPLICABILITY

According to the present disclosure, it is possible to provide a high-pressure hydrogen apparatus gas seal member which is excellent in durability and is capable of sufficiently suppressing an occurrence of a blister fracture.

Further, according to the present disclosure, it is possible to provide a high-pressure hydrogen apparatus which is less likely to have an occurrence of a blister fracture of a gas seal member even used for long time, and is thus capable of reducing the maintenance cost.

REFERENCE SIGNS LIST

100 Hydrogen station
111 Hydrogen manufacturing apparatus
111A Fuel reformer
111B Hydrogen purifier
112 Hydrogen gas compressor (pressor)
113 Gas storage (pressure storage)
114 Dispenser
115 Hydrogen supply hose
116 Hydrogen supply plug
117 Disengagement coupling
118 Hydrogen pipe
120 Vehicle (fuel cell vehicle)
121 Receptacle

The invention claimed is:

1. A high-pressure hydrogen apparatus gas seal member made of a crosslinked product of an elastomer composition which comprises an elastomer and fibrous carbon nanostructures having an average length of 100 μm or more and 1000 μm or less,
   wherein the fibrous carbon nanostructures have an inner diameter of 2.4 nm or more and 3.6 nm or less, a radius of gyration of 216 nm or more and 400 nm or less, and a surface fractal dimension of 2.3 or more and 3.0 or less.

2. A high-pressure hydrogen apparatus gas seal member made of a crosslinked product of an elastomer composition which comprises an elastomer and fibrous carbon nanostructures having an average length of 100 μm or more and 1000 μm or less,
   wherein the fibrous carbon nanostructures have an inner diameter of 2.4 nm or more and 3.6 nm or less and a radius of gyration of 216 nm or more and 400 nm or less.

3. The high-pressure hydrogen apparatus gas seal member according to claim 1, wherein the fibrous carbon nanostructures have an outer diameter of 3.0 nm or more and 20 nm or less.

4. The high-pressure hydrogen apparatus gas seal member according to claim 1, wherein the elastomer is at least one rubber selected from the group consisting of nitrile rubbers, hydrogenated nitrile rubbers, ethylene propylene diene rubbers, silicone rubbers, and fluororubbers.

5. The high-pressure hydrogen apparatus gas seal member according to claim 1, wherein the fibrous carbon nanostructures comprise single-walled carbon nanotubes.

6. The high-pressure hydrogen apparatus gas seal member according to claim 1, wherein the elastomer composition contains the fibrous carbon nanostructures in a proportion of 1 part by mass or more and 10 parts by mass or less per 100 parts by mass of the elastomer.

7. The high-pressure hydrogen apparatus gas seal member according to claim 1 used in contact with high-pressure hydrogen at 35 MPa or more and 105 MPa or less.

8. A high-pressure hydrogen apparatus comprising:
   a vessel filled with high-pressure hydrogen at 35 MPa or more and 105 MPa or less; and
   the high-pressure hydrogen apparatus gas seal member according to claim 1 being in contact with the high-pressure hydrogen filled in the vessel.

9. The high-pressure hydrogen apparatus gas seal member according to claim 2, wherein the fibrous carbon nanostructures have an outer diameter of 3.0 nm or more and 20 nm or less.

10. The high-pressure hydrogen apparatus gas seal member according to claim 2, wherein the elastomer is at least one rubber selected from the group consisting of nitrile rubbers, hydrogenated nitrile rubbers, ethylene propylene diene rubbers, silicone rubbers, and fluororubbers.

11. The high-pressure hydrogen apparatus gas seal member according to claim 2, wherein the fibrous carbon nanostructures comprise single-walled carbon nanotubes.

12. The high-pressure hydrogen apparatus gas seal member according to claim 2, wherein the elastomer composition contains the fibrous carbon nanostructures in a proportion of 1 part by mass or more and 10 parts by mass or less per 100 parts by mass of the elastomer.

13. The high-pressure hydrogen apparatus gas seal member according to claim 2 used in contact with high-pressure hydrogen at 35 MPa or more and 105 MPa or less.

14. A high-pressure hydrogen apparatus comprising:
   a vessel filled with high-pressure hydrogen at 35 MPa or more and 105 MPa or less; and
   the high-pressure hydrogen apparatus gas seal member according to claim 2 being in contact with the high-pressure hydrogen filled in the vessel.

* * * * *